Aug. 25, 1953  M. KER  2,650,342
MAGNETIC AMPLIFIER CIRCUIT
Filed Feb. 23, 1952
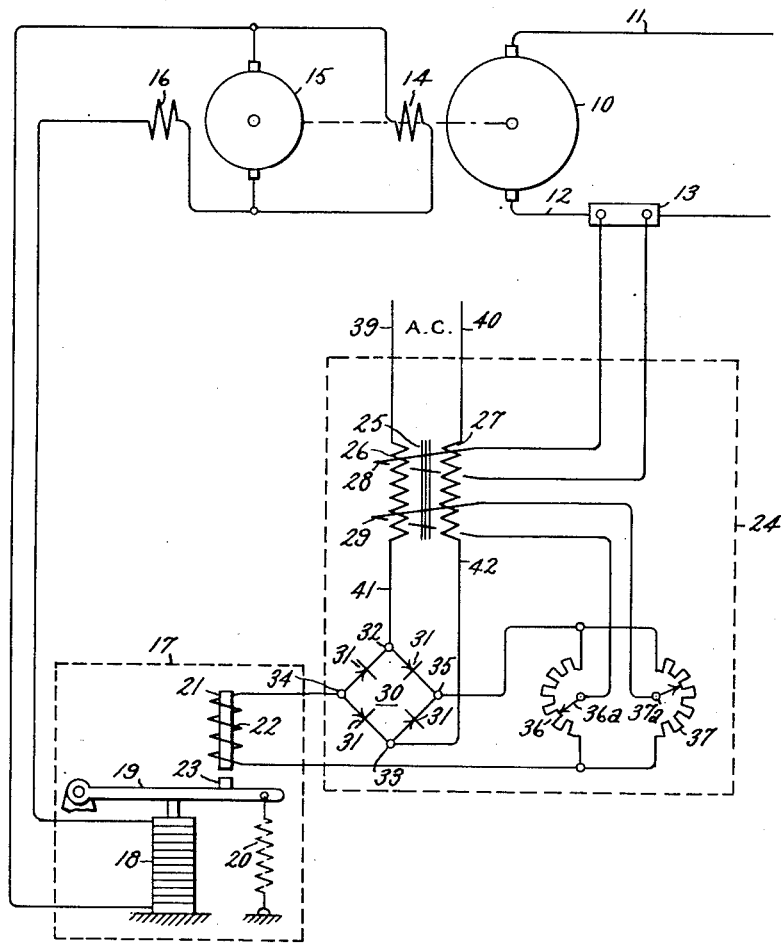
Inventor:
Montgomery Ker,
by  *Claude N. ...*
His Attorney.

Patented Aug. 25, 1953

2,650,342

UNITED STATES PATENT OFFICE 2,650,342

MAGNETIC AMPLIFIER CIRCUIT

Montgomery Ker, Scotia, N. Y., assignor to General Electric Company, a corporation of New York Application February 23, 1952, Serial No. 273,095

3 Claims. (Cl. 323—89)

1

This invention relates to magnetic amplifier systems, and more particularly to magnetic amplifiers having feed-back windings for affecting the output of the magnetic amplifiers.

The principal object of this invention is to provide a simple and efficient means for varying the amplification and, hence, the output current of a magnetic amplifier.

Other objects, features and advantages of my invention will be apparent from the subsequent detailed description of a preferred embodiment thereof, while the scope of the invention is set forth in the appended claims.

In carrying out my invention in one form, I provide a magnetic amplifier comprising a saturable core reactor having a pair of load windings supplied from a source of alternating current, and a pair of control or saturating windings. One of the control windings is utilized for partially saturating the core of the saturable reactor and thereby affecting the alternating current passing through the load windings. The other control winding is utilized as a feedback winding for supplying selectively positive, negative or zero feedback. The second control winding is energized by being connected between the sliders of a pair of potentiometer resistors. These potentiometer resistors are connected in parallel, and arranged to carry direct currents proportional to the current through the load windings by being connected to a bridge rectifier in circuit with the load current. The second control winding, as a result, provides a feedback which is positive, negative or zero depending on the relative settings of the sliders of the two potentiometers.

This invention is described and illustrated herein in connection with a simple saturable reactor type magnetic amplifier, but it will be understood that it is equally applicable to other magnetic amplifiers, such as the self saturating type, for example.

For a clearer and more detailed understanding of the invention, reference should be had to the accompanying drawing in which the single figure is a diagram of an electrical circuit embodying the invention.

Referring to the drawing, there is shown an automatic current regulating system for a direct current generator, which system embodies the magnetic amplifier circuit of this invention. The generator, which is designated by the numeral 10, supplies current to an external load (not shown) through a pair of armature terminal conductors 11 and 12. A shunt 13 is connected in

2 circuit with conductor 12 for reasons which appear hereinafter.

The generator 10 has a suitable excitation circuit which is represented diagrammatically by the winding 14. This winding may be energized by an exciter 15 which, as illustrated, is directly mechanically connected to the shaft of generator 10 for operation in synchronism with the generator. Also as illustrated, exciter 15 is of the self-excited type having an excitation winding 16 for supplying excitation thereto.

The armature current from generator 10 may be regulated to maintain it at a predetermined value by means of a regulator 17 which controls the excitation of exciter 15 and through this exciter the excitation of generator 10. Regulator 17, as illustrated, includes a carbon pile 18 connected in series with exciter excitation winding 16, and a pivoted lever 19 arranged to vary the compression on carbon pile 18 and thereby to vary the resistance of this carbon pile, in a well known manner. The carbon pile may be biased toward the compressed or minimum resistance position by a tension spring 20, while an electromagnet device 21 having an energizing winding 22 may be arranged to attract an armature 23 mounted on lever 19, the pull exerted by electromagnet 21 on armature 23 opposing spring 20 and tending to move carbon pile 18 to the decompressed or maximum resistance position.

As shown, the coil 22 of the regulator is supplied with alternating current which is approximately proportional to the current through shunt 13, through the medium of a magnetic amplifier circuit 24. This circuit 24 includes a saturable core reactor 25 having a pair of alternating current load windings 26 and 27, and two unidirectional current control windings 28 and 29. Saturable core reactor 25 is shown diagrammatically, and this device may take any conventional form such as a three-legged laminated core, for example, with the two load windings wound on the two outer legs and the two control windings on the center leg. Connections 39 and 40 are provided for the load windings to a source of alternating current (not shown) which may, for example, be a conventional source of 60 cycle current. The current passing through the load windings 26 and 27 is utilized to energize control winding 22 of the regulator, such current passing also through suitable intervening connections such as 41 and 42 and through a rectifier device 30 which is illustrated as a bridge type rectifier having four half-wave unidirectional conducting devices 31. Devices 31 are preferably of the dry type and substantially identical in characteristics.

The load windings 26 and 27 are connected to terminals 32 and 33 of bridge rectifier 30 which terminals may be referred to as the alternating voltage terminals. Connected between the other two terminals 34 and 35 of rectifier 30, which may be referred to as the direct current terminals, is a pair of potentiometer resistors 36 and 37, the circuit from terminal 34 to the potentiometers including winding 22. Potentiometers 36 and 37 preferably are substantially identical as to their total resistance and the increments of resistance provided by moving their respective slides 36a and 37a. The two sliders 36a and 37a are connected respectively to the terminals of second control winding 29.

The first control winding 28 is connected to be energized by the voltage drop across shunt 13, which voltage drop is proportional to the current flowing through conductor 12.

The operation of the regulating system shown in the drawing is as follows. A signal voltage is derived from shunt 13, which signal voltage is proportional to the current in armature conductor 12 to be regulated and maintained at a predetermined value. This signal voltage is amplified by magnetic amplifier 24 as a result of the effect of control winding 28 on saturable core reactor 25. The signal voltage produces a current in the control winding 28 which partially saturates the reactor 25, and this partial saturation permits a predetermined amount of alternating current to flow through load windings 26 and 27. This predetermined amount of current energizes operating winding 22 of the regulator. This attracts armature 23 with a force sufficient partially to counteract the effect of spring 20 and maintain the resistance of carbon pile 18 at a certain value. The resistance of the carbon pile 18 under this condition is just enough to permit sufficient excitation current to flow in excitation winding 16 of the exciter 15 to generate enough excitation voltage to excite excitation winding 14 of the generator sufficiently to maintain the current in conductors 11 and 12 at the desired value.

Assume now, for purpose of illustration, that a slight increase in the current conductors 11 and 12 occurs, raising this current above the value which is desired to maintain. This increase, by increasing the signal voltage derived from shunt 13, increases the saturation of saturable core reactor 25. This increases the alternating current flowing through reactor 25 which increases the pull exerted by device 21 on armature 23. This, in turn, reduces the compression on carbon pile 18 and increases the resistance of this carbon pile, which reduces the current in exciter excitation winding 15 and consequently reduces the voltage of exciter 15. This reduces the excitation of generator 10 until the resulting reduction in the armature current output of the generator reduces the current in conductors 11 and 12 to the desired value and equilibrium is restored.

A reduction in the generator output current flowing in conductors 11 and 12 below the desired value results in the opposite operation of the regulating system to that described in the preceding paragraph, and the consequent increase of the current to the equilibrium value.

My invention provides a desirable and useful arrangement for adjusting the generator output current maintained by the regulator. In my circuit, the amplification of magnetic amplifier 24, and consequently the amount of current supplied to the regulator operating coil 22 for a particular signal voltage from shunt 13 is controlled by the relative positions of sliders 36a and 37a of potentiometers 36 and 37.

It will be understood that for any selected position of the slider of one potentiometer providing a certain potential, there is a corresponding position of substantially equal potential on the other potentiometer. When the two sliders are positioned in such equal potential positions, no current flows in control winding 29. If either of the potentiometer sliders is moved from its equal potential position, however, so that the potentials of the two sliders are unbalanced, current flows in winding 29. Such current produces a magnetomotive force which opposes the magnetomotive of winding 28 for one direction of movement of the slider, and produces an additive magnetomotive force for the other direction of movement of the slider. Therefore, by relative movements of sliders 36 and 37a, either positive, negative or zero feedback can be obtained. When the sliders 36a and 37a are at equal potential positions, zero feedback is provided, while positive or negative feedback is provided when the sliders are not at equal potential position, the feedback being positive when the magnetomotive force of winding 29 adds to that of winding 28 and negative when the magnetomotive force of winding 29 opposes or bucks that of winding 28.

With this arrangement, if it is desired to maintain less output current from generator 10, the feedback is increased positively, i. e., one or both of sliders 36a and 37a are moved so that the feedback becomes either less negative or more positive. This increases the output of magnetic amplifier 24 for a particular signal voltage from shunt 13. This increases the pull on armature 23 and pivots arm 19 to reduce the compression of carbon pile 18 and increase the resistance across this carbon pile. This reduces the armature voltage of exciter 15, with a resulting reduction of the excitation of generator 10. This reduces the output current of generator 10 until equilibrium is restored at a new value smaller than the value previously maintained by the regulating system.

If it is desired to increase the generator current held by the regulating system, one or both of the sliders 36a and 37a are moved so that the resulting voltage and current fed back to winding 29 are more negative than previously, viz., produce a greater opposing effect on winding 28 than previously. This has the opposite effect of that just described and results in the holding of a larger generator armature output current.

My invention provides a magnetic amplifier circuit which greatly increases the range over which a particular saturable core reactor may be operated, or looking at it another way, it makes possible the use of a much smaller saturable core reactor in a particular circuit. It will be understood also, by those familiar with feedback circuits, that in the positive feedback range the sensitivity of the magnetic amplifier and hence the sensitivity of the regulator is increased, while in the negative feedback range the stability of both is increased. In a current regulating system such as that illustrated in Fig. 1, this means that the sensitivity is increased for smaller values of current while the stability is increased for larger values of current, and both of these conditions are very desirable in such a regulating system.

It will be understood that my invention is not limited in its usefulness to the particular current regulating system illustrated and described herein. It will be readily apparent, for example, that it could be applied with equal facility to a voltage regulating system, inasmuch as the signal appearing across shunt 13 is actually a voltage signal, being the voltage drop across the shunt produced by the current therein.

Nor is the invention limited to the particular saturable reactor arrangement illustrated. For example, a saturable transformer can be employed instead. By saturable transformer I mean a saturable core device having one or more primary alternating current windings connected to the source of alternating current and one or more secondary alternating current windings connected to the load. Such a device can be used instead of the saturable core reactor illustrated and described herein, providing only that two control windings for affecting the core saturation are present.

It should be understood also that my invention is not limited to potentiometer devices having sliders such as those described and illustrated herein, and that other equivalent adjustable rheostatic devices may be employed, if desired. The essential requirement is that such devices be provided with adjustable tap means for deriving various selected potentials intermediate the potential applied to the terminals of the devices. Furthermore, in some cases, where only a relatively small adjustment is required, it is not necessary that both of the devices have adjustable tap means. That is, it may be possible to employ in place of one of the adjustable tap devices, a resistor having a fixed intermediate tap voltage or two fixed resistors connected in series and providing a junction of intermediate potential.

Therefore, while I have illustrated and described my invention in one preferred form thereof, it will be understood that modifications may be made by those skilled in the art, and I intend by the appended claims to cover all such modifications which fall within the true spirit and scope of my invention.

What I claim as new and desire to secure by Letters Patent of the United States is:

1. A magnetic amplifier system comprising a saturable reactor having at least one load winding and two control windings, load current circuit means including connections to a load for consuming current from the said load winding, rectifier means connected in said load current circuit, a pair of parallel connected resistor devices each having tap means for deriving an intermediate potential therefrom connected to said rectifier means, the tap means for at least one of said resistor devices being adjustable to provide a plurality of intermediate potentials, said resistor devices being arranged to carry unidirectional currents proportional to the current passing through the said load current circuit, connections to a source of signal voltage for energizing one of the said control windings to affect the saturation of the said reactor and thereby affect the passage of current through the said load current circuit, and means connecting the said second control winding to the said two tap means for energization by the potential between the two tap means whereby the said second control winding affects the action of the said first control winding in affecting the passage of current through the said load current circuit by an amount dependent in sense and magnitude upon the relative positions of the said two tap means.

2. A magnetic amplifier system comprising a saturable reactor having at least one load winding and two control windings, load current circuit means including connections to a source of alternating current for supplying current for passage through said load winding and connections to a load for consuming the current passing through said load winding, unidirectional conducting device means connected in the said load current circuit, a pair of parallel connected potentiometer devices each having adjustable slider means for deriving intermediate potentials therefrom connected to said unidirectional conducting device means, said potentiometer devices being arranged to carry unidirectional currents proportional to the said current passing through the said load current circuit, connections to a source of signal voltage for energizing one of said control windings to control the saturation of said reactor and thereby regulate the amount of current passing through the said load current circuit, and means connecting said second control winding to said two adjustable slider means for energization by the potential between the two sliders whereby said second control winding affects the action of the said first control winding in controlling the saturation of said reactor by an amount dependent in sense and magnitude upon the relative positions of the two said sliders.

3. A magnetic amplifier system comprising a saturable reactor having at least one load winding and two control windings, load current circuit means including connections to a source of alternating current for supplying current for passage through said load winding and connections to a load for consuming the current passing through said load winding, a bridge rectifier device having alternating current terminals and direct current terminals, means connected to the said alternating current terminals connecting the said bridge rectifier device in said load current circuit, a pair of potentiometers each having an adjustable slider for deriving intermediate potentials therefrom, said potentiometers being connected in parallel between said direct current terminals whereby said potentiometers carry unidirectional currents forming portions of the current passing through the said load current circuit, connections to a source of signal voltage for energizing a first of said control windings to partially saturate said reactor and thereby control the amount of current passing through the said load current circuit, and means connecting said second control winding to said two sliders for energization by the potential difference between the two sliders whereby said second winding affects the saturating action of the said first control winding and thereby affects the current passing through said load current circuit by an amount depending in sense and magnitude upon the relative positions of the two said adjustable sliders.

MONTGOMERY KER.

No references cited.